(12) United States Patent
Jannotta

(10) Patent No.: US 9,581,261 B2
(45) Date of Patent: Feb. 28, 2017

(54) VALVE ASSEMBLIES WITH INTERNAL PROTECTIVE ELEMENTS AND METHODS OF USING SAME

(71) Applicant: L&J Engineering, Inc., Hillside, IL (US)

(72) Inventor: Louis J Jannotta, Orland Park, IL (US)

(73) Assignee: L&J ENGINEERING, INC., Hillside, IL (US)

( * ) Notice: Subject to any disclaimer, the term of this patent is extended or adjusted under 35 U.S.C. 154(b) by 7 days.

(21) Appl. No.: 14/874,705

(22) Filed: Oct. 5, 2015

(65) Prior Publication Data

US 2016/0161011 A1 Jun. 9, 2016

Related U.S. Application Data

(60) Provisional application No. 62/088,063, filed on Dec. 5, 2014.

(51) Int. Cl.

| F16K 27/02 | (2006.01) |
|---|---|
| F16K 1/02 | (2006.01) |
| F16K 1/32 | (2006.01) |
| F16K 31/50 | (2006.01) |
| E03B 9/14 | (2006.01) |
| E03B 9/02 | (2006.01) |
| E03B 7/12 | (2006.01) |
| F16K 1/44 | (2006.01) |

(52) U.S. Cl.
CPC ............... *F16K 27/02* (2013.01); *E03B 7/12* (2013.01); *E03B 9/027* (2013.01); *E03B 9/14* (2013.01); *F16K 1/02* (2013.01); *F16K 1/32* (2013.01); *F16K 1/446* (2013.01); *F16K 31/50* (2013.01); *Y10T 137/3331* (2015.04); *Y10T 137/5497* (2015.04); *Y10T 137/5762* (2015.04)

(58) Field of Classification Search
CPC . F16K 27/02; F16K 31/50; F16K 1/32; F16K 1/02; F16K 1/446; E03B 9/027; E03B 9/14; E03B 7/12; Y10T 137/5497; Y10T 137/5762; Y10T 137/698; Y10T 137/87981; Y10T 137/88046; Y10T 137/3331
USPC ......... 251/320–323, 229; 137/301, 312, 360, 137/614.11, 614.19, 218
See application file for complete search history.

(56) References Cited

U.S. PATENT DOCUMENTS

| 1,846,623 | A | * | 2/1932 | Volk | ........................... E03B 9/20 137/305 |
|---|---|---|---|---|---|
| 2,625,173 | A | * | 1/1953 | Hodes, Jr. | ................. E03B 7/12 137/360 |
| 4,209,033 | A | * | 6/1980 | Hirsch | ....................... E03B 7/12 137/218 |

(Continued)

OTHER PUBLICATIONS

96181 Water Drain Valve, Shand & Jurs, Hillside, IL, 2005.

*Primary Examiner* — John Bastianelli
(74) *Attorney, Agent, or Firm* — Stout, Uxa & Buyan, LLP; Frank L. Uxa

(57) ABSTRACT

Valve assemblies which comprise a valve housing; an inner valve element; an outer valve element spaced apart from the inner valve element; a valve stem on which both the inner valve element and the outer valve element are located; a portion of the valve stem between the inner valve element and the outer valve element is threaded; and a protective element located within the valve housing and covering the threaded portion of the valve stem.

17 Claims, 3 Drawing Sheets

(56) References Cited

U.S. PATENT DOCUMENTS

| | | | | |
|---|---|---|---|---|
| 4,473,244 A * | 9/1984 | Hill | ............................ | E03B 7/12 |
| | | | | 137/360 |
| 5,012,833 A * | 5/1991 | Hunley, Jr. | ............. | E03B 9/025 |
| | | | | 137/15.02 |
| 5,392,805 A * | 2/1995 | Chrysler | ................. | E03B 9/025 |
| | | | | 137/218 |
| 5,752,542 A * | 5/1998 | Hoeptner, III | ............ | E03B 9/02 |
| | | | | 137/218 |
| 6,394,125 B2 * | 5/2002 | White | ........................ | E03B 7/10 |
| | | | | 137/301 |
| 6,532,986 B1 * | 3/2003 | Dickey | ...................... | E03B 7/10 |
| | | | | 137/218 |
| 6,668,852 B1 * | 12/2003 | Williamson | ............... | E03B 7/12 |
| | | | | 137/301 |
| 7,438,082 B2 * | 10/2008 | Klee | ........................ | E03B 9/14 |
| | | | | 137/301 |
| 7,828,005 B2 * | 11/2010 | Lawson | .................... | E03B 7/10 |
| | | | | 137/301 |

\* cited by examiner

VALVE ASSEMBLIES WITH INTERNAL PROTECTIVE ELEMENTS AND METHODS OF USING SAME

RELATED APPLICATION

This application claims the benefit of U.S. Provisional Application Ser. No. 62/088,063, filed Dec. 5, 2014, the disclosure of which is hereby incorporated in its entirety herein by this reference.

BACKGROUND OF THE INVENTION

The present invention relates to valve assemblies, for example, valve assemblies which are operated to facilitate and/or control fluid flow, and to methods of using same. The present valve assemblies include a valve housing through which fluid, e.g., liquid and/or gas, can pass between an inner or first valve element and an outer or second valve element.

Drain valves, for example, water drain valves and the like, are designed to provide high flow-capacity, leak-proof shut-off and non-freezing operation.

Such valves may utilize a double valve element construction which includes an inner valve and an outer valve that both operate on the same valve stem, for example, permitting the valve chamber, that is, the space between the inner and outer valves, to drain sufficiently before the outer valve is closed.

Because of the advantageous high flow capacity of such valves, the flow rate or velocity of the fluid in the valve chamber is quite high. Also, the fluid, e.g. liquid, being passed through the valve assembly can be, and often is, contaminated with materials, such as solid particles, dirt and the like, which can cause damage to and/or hinder the operation of the valve. It is often not possible or impractical to use mechanical means, such as filters, to ensure that the fluid being passed through the valve is contaminant free.

Because of the double action, single handwheel, single valve stem mechanisms of many of such valves, the valve stem between the inner and outer valve elements includes one or more threaded portions, which facilitate the ability of the single handwheel to open or close each of the inner and outer valve elements, as desired.

Thus, it may be important, even necessary, to have a portion of the valve stem be threaded. Exposing the threaded portion of the valve stem to the fluid (liquid) being passed through the valve can have a number of detrimental consequences.

For example, the threads of the threaded portion of the valve stem can become contaminated, e.g., clogged or blocked, by debris in the fluid being passed through the valve. This can result in the valve not functioning properly or even becoming non-functional. In this event, the valve may have to be taken out of service and cleaned, which can be time and/or labor intensive, and may require shutting down the operation in which the valve is used.

In another circumstance, the threads of the threaded portion of the valve stem are often lubricated, e.g., with grease and the like lubricants, to facilitate the functioning of the threaded portion. With the threaded portion being exposed to a high flow of fluid in the valve, the lubricant may be lost from the threaded portion of the valve stem, which can adversely affect the performance of the valve and result in added cost and/or process downtime. Moreover, the lubricant from the threaded portion may be lost in a product passing through the valve, which may result in unwanted, disadvantageous and costly contamination of the product.

Other disadvantages of having the threaded portion of such a valve stem exposed to large volumes of flowing fluid include, for example, harmful corrosion of the threaded portion; reduced valve life; more frequent and/or more extensive valve service/maintenance and the like.

All of the disadvantages of using a valve with a valve stem having a threaded portion exposed to the fluid being processed through the valve have had to be endured because the functioning of the valve required that such a threaded portion of the valve stem be present.

SUMMARY OF INVENTION

The present invention provides valve assemblies, and methods of using valve assemblies, which include a valve stem including a threaded portion and mitigates against, or substantially avoids, one or more of the disadvantages of such a threaded portion, for example, as noted above and/or elsewhere herein.

In one example, the present invention is directed to a valve assembly comprising a valve housing, an inner valve element, an outer valve element spaced apart from the inner valve element, a valve stem on which both the inner valve element and the outer valve element are located, a portion of the valve stem between the inner valve element and the outer valve element being threaded, and a protective element located within the valve housing and covering the threaded portion of the valve stem.

The protective element of the present valve assembly effectively physically isolates the threaded portion of the valve stem from the rest of the valve assembly, while at the same time, allowing the threaded portion to function in a substantially normal or effective manner to facilitate the operation of the valve assembly.

Since the threaded portion is physically isolated from the remainder of the valve assembly, the threaded portion does not become contaminated by debris or foreign matter; remains properly lubricated for extended periods of time; does not contaminate product passing through the valve; and is able to properly function for longer periods of time and/or with reduced maintenance.

In one example, the threaded portion of the valve stem covered by the protective element is closer to the outer valve element than to the inner valve element.

In one example, the protective covering is secured to the outer valve element.

In one example, the valve stem is moveable within the protective element.

The protective element may provide a substantially fluid or liquid tight environment in which the threaded portion of the valve shaft is located.

In one example, the valve assembly further comprises a seal element positioned between the protective element and the valve stem and being effective to substantially prevent fluid or liquid from passing across the seal element.

The valve stem may include a hollow tubular section having a first end and an opposing second end. In one example, at least one of the first end and second end of the hollow tubular section is threaded. In one example, both the first end and the second end of the hollow tubular section are threaded. The threaded end or ends of the hollow tubular section may have internal threads.

In one example, the hollow tubular section has or includes a groove extending inwardly and circumferentially from an outer surface of the hollow tubular section. Preferably, the groove does not extend completely through the hollow tubular section.

The valve assembly may include a seal element located in the groove and in contact with the protective element.

In one example, the valve assembly further comprises a common valve stem and both the inner valve element and the outer valve element are operable with a single handwheel.

The single handwheel may be located closer to the outer valve element than to the inner valve element.

In one example, the valve assembly is constructed so that foreign matter located in a fluid passed through the valve assembly substantially does not come in contact with the threaded portion of the valve stem covered by the protective element.

The threaded portion of the valve stem covered the protective element may include added lubrication, and the protective element is effective in maintaining the added lubrication on this threaded portion for a longer period of time during valve assembly operation relative to valve assembly operation without the protective element being present.

In one example, the threaded portion of the valve shaft may have a longer useful life relative to a substantially identical valve assembly including a threaded portion of the valve stem without the protective element being present.

Various examples of the present invention are described in detail in the detailed description and additional disclosure below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention.

DETAILED DESCRIPTION

Figure 1:
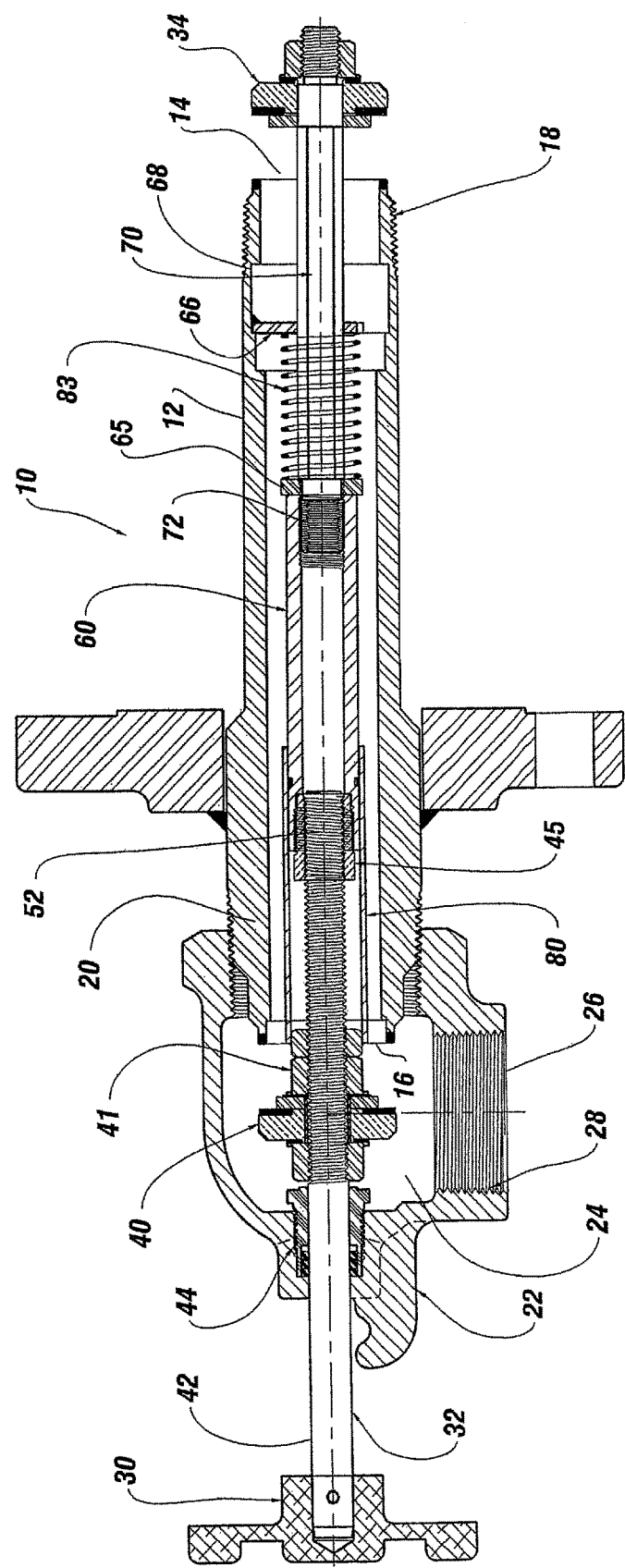
FIG. 1 is a cross-sectional view of a valve assembly.

FIG. 1 shows a valve assembly 10 in cross section. The valve assembly includes a valve body housing 12, an inlet opening 14, and an outlet opening 16.

An inlet portion 18 of the valve body housing is threaded to facilitate fastening the housing to a transfer pipe (not shown) carrying liquid to be passed through the valve assembly 10.

The outlet portion 20 of the valve body housing 12 is threaded to facilitate fastening or securing the valve body housing to outlet elbow 22 which provides a pathway for liquid passing through the valve assembly 10 from the inlet opening 14 through the outlet opening 16, into space 24 and out of the elbow opening 26. The outlet elbow 22 includes a threaded outlet portion 28 to allow a pipe or other conduit to be joined to the elbow so that liquid passing through the valve assembly 10 can pass out of the valve assembly.

A handwheel 30 and associated assembly, shown generally at 32, control the operation of valve 10, as is discussed hereinafter.

Valve assembly 10 includes an inner valve, shown generally at 34 and an outer valve, shown generally at 40. The inner valve 34 and the outer valve 40 are operationally linked together with handwheel 30 and associated assembly 32 to control the valve assembly 10 between a fully closed position, in which both inner valve 34 and outer valve 40 are closed to the flow of liquid through the valve 10; a fully open position, in which both inner valve 34 and outer valve 40 are open to the flow of liquid through the valve 10; and a drain position in which the inner valve 34 is closed to flow of liquid through the valve 10 and the outer valve 40 is open to allow liquid to exit the valve 10. The handwheel 30 is rotated clockwise and/or counterclockwise to obtain the desired open/closed positions of the inner and outer valves. The handwheel 30 and associated assembly are considered the valve stem (hereinafter referred to by reference number 32) since such handwheel and associated assembly control and facilitate the operation of the valve 10.

Briefly, the valve stem 32, including the handwheel 30, is constructed to allow the handwheel 30 to be manipulated so that the flow of liquid through valve 10 can be controlled, as desired.

Thus, valve stem 32 includes a wheel rod 42 one end of which is secured directly to handwheel 30. Wheel rod 42 passes through an opening in outlet elbow 22, through a conventional fluid-tight seal 44, through outer valve 40 and into and through threaded bushing 45 and into connector element 60. The portion of the wheel rod 42 which passes through the outer valve 40 to the distal end of the wheel rod 42 is threaded.

Such threading allows the turning of the handwheel 30 to move the outer valve between the open and closed positions.

Figure 2:
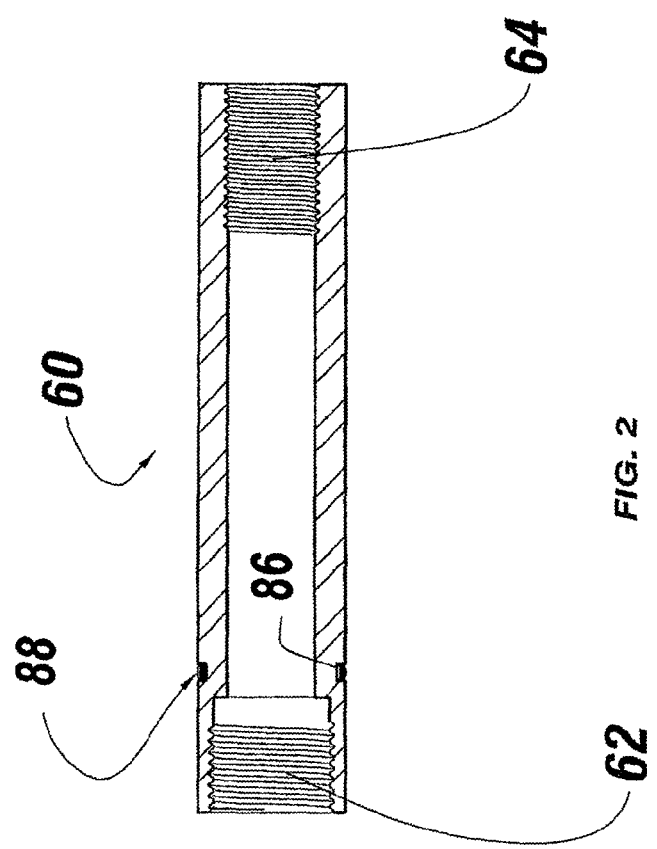
FIG. 2 is a cross-sectional view of the double threaded connector element (hollow tubular section) of the valve assembly shown in FIG. 1.

The distal portion 52 of the wheel rod 42 is received in a threaded busing 45 and then into first threaded end portion 62 of connector element 60 (see FIG. 2). Connector element 60 includes a second threaded end portion 64, positioned on the end of connector element 60 opposite first threaded end portion 62.

An inner valve rod 70 includes a threaded end portion 72 which are sized and configured to mate with the threads of second threaded end portion 64 of connector 60.

Spring member 83 surrounds a portion of rod 70. Spring member 83 is confined between an outer annular ring 65 affixed to the end of connector element 60 and stationary block or wall 66 located on and secured to the inner wall 68 of housing 12.

This combination of components allows the handwheel to be operated (by hand) to control the operation (opening and closing) of the inner valve 34.

Valve assembly 10 includes a number of conventional seals or gaskets and the like which are deployed to provide or insure effective, for example, liquid or fluid tight, operation of the valve assembly. Such conventional seal/gasket components are illustrated in the attached drawings, for example, in black at various locations in the drawings where effective liquid/fluid tight sealing between components is useful or advantageous. Such seals, gaskets and the like may be made of any suitable material or materials of construction, such as polymeric materials and the like. Each of such components effectively function in the valve assembly 10 to achieve the desired results.

The valve assembly 10 as described thus far provides generally satisfactory operation and results.

However, it has been found that in a valve, such as valve assembly 10, in which the threaded portion of the rod between the connector element 60 and the outer valve is exposed to operation in controlling the flow of liquids, the valve may become compromised, for example, become contaminated with debris from the liquid through the valve, are found to be not properly lubricated and/or otherwise lose operational efficiency. Such issues require or lead to operational down time, as well as valve cleaning, repair and/or replacement.

It has been discovered that these issues can be resolved or reduced in severity by reducing, or even substantially eliminating exposure to the liquid being processed by the threaded portion of the rod (wheel rod 42) between the outer valve 40 and the connector element 60.

Figure 3:
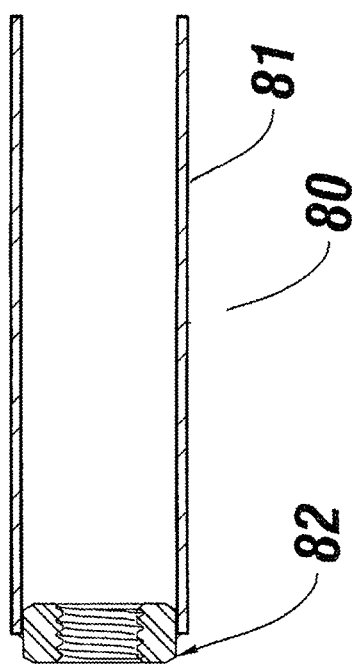
FIG. 3 is a cross-sectional view of the protective element of the valve assembly shown in FIG. 1.

In one example, an internal protective element 80 is provided. As shown in FIGS. 1 and 3, the protective element 80 includes a hollow cylinder 81, for example, made of any suitable material of construction, such as metal, e.g., steel, iron, stainless steel, aluminum, etc., substantially resistant to attack in the environment in which it is to be used.

The protective element 80 is secured to the inner portion 41 of the outer valve 40. The protective element 80 is sized and adapted to cover, surround and extend beyond the threaded portion 62 (see FIG. 2) of the connector element 60 which is toward the outer valve 40.

In one example, the protective element 80 is placed so that the protective element, or a portion thereof, always surrounds at least a portion of the connector element 60, so that the threaded portion of the rod 42 between the outer valve 40 and the connector element 60 is protected from the liquid being passed through the valve 10.

In one example, as shown in FIG. 3, the protective element 80 includes a threaded nut 82 secured, e.g., welded or otherwise secured, to one end of the protective element. The threads of threaded nut 82 are compatible with the threads on wheel rod 42. This feature allows the threaded portion of rod 42 to pass into and through the protective element 80 without disruption while maintaining the space defined by the protective element substantially liquid free.

In one useful example, as shown in FIG. 2, the connector element 60 includes a groove 86 extending around the outer periphery of the connector. A suitably sized, flexible, e.g., rubber, plastic, elastomeric and the like, O-ring 88 is placed in the groove. This construction provides an effective seal to prevent liquid from coming into contact with the threaded portion of the rod 42 protected by protective element 80.

The components of the present valve assemblies can be made of any suitable materials of construction, for example, materials of construction which are effective in and resistant to the environment in which the valve assemblies are used and resistant to the materials (e.g., liquids) passing through the valve assemblies.

Examples of materials of construction for components of the present valve assemblies include, but are not limited to, metals, such as steel, stainless steel, brass, bronze, and aluminum.

Except as described herein, the structure and operation of the valve assemblies disclosed herein is substantially similar to the structure and operation of the Shand & Jurs 96181 Water Drain Valve.

While the present invention has been described with respect to various specific examples and embodiments, it is to be understood that the invention is not limited thereto and that it may be variously practiced within the scope of the following additional disclosure in claim format.

What is claimed is:

1. A valve assembly comprising:
   a valve housing;
   an inner valve element secured to an inner valve rod which extends into the valve housing;
   an outer valve element secured to a valve stem which extends into the valve housing, the valve stem has a threaded segment and is secured to a handwheel;
   a connector element located in the valve housing, the connector element including a first threaded area in which the threaded segment of the valve stem is received, and a spaced-apart second threaded area in which a threaded segment of the inner valve rod is received; and
   a protective element located within the valve housing and covering a distal portion of the valve stem.

2. The valve assembly of claim 1, wherein the threaded portion of the valve stem covered by the protective element is closer to the outer valve element than to the inner valve element.

3. The valve assembly of claim 1, wherein the valve stem is moveable within the protective element.

4. The valve assembly of claim 1, wherein the protective element provides a substantially fluid or liquid tight environment in which the threaded portion of the valve stem covered by the protective element is located.

5. The valve assembly of claim 1, which further comprises a seal element positioned between the protective element and the connector element and being effective to substantially prevent liquid from passing across the seal element.

6. The valve assembly of claim 5 wherein the connector element includes a hollow tubular section having a first end and an opposing second end.

7. The valve assembly of claim 6 wherein at least one of the first end and the second end of the connector element is threaded.

8. The valve assembly of claim 6, wherein both the first end and the second end of the connector element are threaded.

9. The valve assembly of claim 7, wherein the threaded end or ends of the connector element have internal threads.

10. The valve assembly of claim 6, wherein the connector element has a groove extending inwardly and circumferentially from an outer surface of the connector element.

11. The valve assembly of claim 10, which further comprises a seal element located in the groove and in contact with the protective element.

12. The valve assembly of claim 1, wherein both the inner valve element and the outer valve element are operable with a single handwheel.

13. The valve assembly of claim 12, wherein the single handwheel is located closer to the outer valve element than to the inner valve element.

14. The valve assembly of claim 1, which is constructed so that foreign matter located in a fluid passed through the valve assembly substantially does not come in contact with the threaded portion of the valve stem covered by the protective element.

15. The valve assembly of claim 1, wherein the threaded portion of the valve stem covered by the protective element includes added lubrication, and the protective element is effective in maintaining the added lubrication on said threaded portion of the valve stem for a longer period of time during valve assembly operation relative to valve assembly operation without the protective element being present.

16. The valve assembly of claim 1, wherein the threaded portion of the valve stem covered by the protective element has a longer useful life relative to a substantially identical valve assembly including a threaded portion of the valve stem without the protective element being present.

17. A method of controlling the flow of a liquid comprising providing the valve assembly of claim 1; providing the liquid to the valve assembly and controlling the valve assembly to obtain the desired flow of the liquid.

* * * * *